(12) United States Patent
Ding et al.

(10) Patent No.: US 12,177,816 B2
(45) Date of Patent: Dec. 24, 2024

(54) RESOURCE EXCLUSION METHOD AND APPARATUS, AND STORAGE MEDIUM

(71) Applicant: GUANGDONG OPPO MOBILE TELECOMMUNICATIONS CORP., LTD., Guangdong (CN)

(72) Inventors: Yi Ding, Guangdong (CN); Zhenshan Zhao, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 338 days.

(21) Appl. No.: 17/747,964

(22) Filed: May 18, 2022

(65) Prior Publication Data

US 2022/0279487 A1 Sep. 1, 2022

Related U.S. Application Data

(63) Continuation of application No. PCT/CN2020/083069, filed on Apr. 2, 2020.

(51) Int. Cl.
*H04W 72/02* (2009.01)
*H04W 72/20* (2023.01)
*H04W 72/542* (2023.01)

(52) U.S. Cl.
CPC ............ *H04W 72/02* (2013.01); *H04W 72/20* (2023.01); *H04W 72/542* (2023.01)

(58) Field of Classification Search
CPC ... H04W 72/02; H04W 72/20; H04W 72/542; H04W 72/40; H04W 72/0446;
(Continued)

(56) References Cited

U.S. PATENT DOCUMENTS

2010/0272073 A1* 10/2010 Bhatnagar ............ H04W 72/52
370/336
2018/0332564 A1 11/2018 Lee et al.
(Continued)

FOREIGN PATENT DOCUMENTS

CN 108024273 5/2018
CN 108024292 5/2018
(Continued)

OTHER PUBLICATIONS

OPPO, "Discussion on remaining open issue for mode 2", 3GPP TSG-RAN WG1 Meeting #100e R1-2000493, Feb. 24-Mar. 6, 2020, pp. 1-14.
(Continued)

*Primary Examiner* — Chi H Pham
*Assistant Examiner* — Raul Rivas
(74) *Attorney, Agent, or Firm* — JCIP GLOBAL INC.

(57) ABSTRACT

A resource exclusion method and apparatus, and a device and a storage medium, relating to the field of communications. The method is applied to a first terminal, and comprises: determining a quantity of reserved periods Q of a second terminal according to a resource reserved period Prx and a threshold Tscal, the threshold Tscal being determined according to a predetermined value; and when a first resource set overlaps a second resource set, excluding a target resource in the first resource set from a candidate resource set in a resource selection window, the second resource set being determined according to the resource reserved period Prx and the quantity of reserved periods Q, wherein the first resource set comprises at least one resource that may be used by the first terminal, and the second resource set comprises at least one resource that can be used by the second terminal.

18 Claims, 8 Drawing Sheets

(58) Field of Classification Search
CPC ......... H04W 28/26; H04W 4/40; H04W 4/70; H04W 24/04; H04W 72/53; H04W 92/18
See application file for complete search history.

(56) References Cited

U.S. PATENT DOCUMENTS

2019/0150197 A1  5/2019  Sheu et al.
2019/0159150 A1  5/2019  Nguyen et al.

FOREIGN PATENT DOCUMENTS

| CN | 110741710 | 1/2020 | |
| EP | 3614774 | 2/2020 | |
| WO | 2017176097 | 10/2017 | |
| WO | WO-2018084614 A1 * | 5/2018 | ........... H04L 5/0005 |
| WO | 2018174661 | 9/2018 | |
| WO | 2019178749 | 9/2019 | |

OTHER PUBLICATIONS

Office Action of India Counterpart Application No. 202227035353, issued on Nov. 10, 2022, pp. 1-7.
"Search Report of Europe Counterpart Application No. 20928543.6", issued on Oct. 20, 2022, pp. 1-10.
Ericsson, "Support for smaller resource reservation periods in V2X", 3GPP TSG RAN WG1 Meeting #86bis R1-1609734, Oct. 2016, pp. 1-6.
3GPP, "14 UE procedures related to Sidelink", 3GPP TS 36.213 V16.0.0, Dec. 2019, pp. 490-549.
3GPP, "3rd Generation Partnership Project; Technical Specification Group Radio Access Network; NR; Physical layer procedures for data (Release 16)", 3GPP TS 38.214 V16.0.0, Dec. 2019, pp. 1-147.
"International Search Report (Form PCT/ISA/210) of PCT/CN2020/083069," mailed on Jan. 6, 2021, with English translation thereof, pp. 1-4.
"Written Opinion of the International Searching Authority (Form PCT/ISA/237) of PCT/CN2020/083069," mailed on Jan. 6, 2021, with English translation thereof, pp. 1-7.
"Office Action of Japan Counterpart Application, Application No. 2022-543626", with English translation thereof, issued on Dec. 5, 2023, pp. 1-8.
Samsung, "On Mode 2 for NR Sidelink", 3GPP TSG RAN WG1 #100 R1-2000617, Mar. 2020, pp. 1-8.
Qualcomm Incorporated, "Sidelink Resource Allocation Mechanism for NR V2X", 3GPP TSG RAN WG1 Meeting #100-e R1-2000963, Mar. 2020, pp. 1-11.
Huawei, "Sidelink resource allocation mode 2 for NR V2X", 3GPP TSG RAN WG1 Meeting #96bis R1-1903947, Apr. 2019, pp. 1-14.
"Office Action of Europe Counterpart Application, Application No. 20928543.6", issued on Jun. 7, 2023, pp. 1-7.
Office Action of China Counterpart Application, Application No. 202210804654.4, with English translation thereof, issued on Jul. 28, 2023, pp. 1-14.
Office Action of India Counterpart Application No. 202227035353, issued on Jun. 19, 2024, pp. 1-3.

* cited by examiner

RESOURCE EXCLUSION METHOD AND APPARATUS, AND STORAGE MEDIUM

CROSS-REFERENCE TO RELATED APPLICATION

This application is a continuation of international PCT application serial no. PCT/CN2020/083069, filed on Apr. 2, 2020. The entirety of the above-mentioned patent application is hereby incorporated by reference herein and made a part of this specification.

BACKGROUND

Technology Field

The application relates to the field of mobile communications, and in particular, to a resource exclusion method, an apparatus, a device, and a storage medium.

Description of Related Art

To implement the direct communication between terminals in the vehicle to everything (V2X) system, a transmission mode of sidelink (SL) is introduced.

In a transmission mode of SL, terminals require to perform resource selections in a resource pool. A terminal determines a resource selection window and a resource listening window, excludes the resources in the resource selection window according to the listening result of the resource listening window, and obtains the candidate resources (resources after the exclusion) of the service to be transmitted. The terminal randomly selects resources from the candidate resources to transmit the service to another terminal, including the initial transmission and retransmission of the service.

In the related art, too many resources in the resource selection window are excluded, resulting in fewer candidate resources remaining in the resource selection window.

SUMMARY

The embodiments of the application provide a resource exclusion method, an apparatus, a device, and a storage medium, which can prevent the problem of excluding too many resources in a resource selection window when a resource reserved period Prx is small. The technical solution is as follows.

According to an aspect of the application, a resource exclusion method is provided, and the method include the following.

A quantity of reserved periods Q of a second terminal is determined according to a resource reserved period Prx and a threshold Tscal, where the threshold Tscal is determined according to a predetermined value.

When a first resource set and a second resource set overlap, a target resource in the first resource set is excluded from a candidate resource set in the resource selection window, and the second resource set is determined according to the resource reserved period Prx and the quantity of reserved periods Q.

The first resource set includes at least one resource possibly used by the first terminal, and the second resource set includes at least one resource possibly used by the second terminal.

According to an aspect of the application, a resource exclusion apparatus is provided, and the apparatus includes the following.

A determination module is configured to determine a quantity of reserved periods Q of a second terminal according to a resource reserved period Prx and a threshold Tscal, where the threshold Tscal is determined according to a predetermined value.

An exclusion module is configured to exclude a target resource in a first resource set from a candidate resource set in a resource selection window when the first resource set and a second resource set overlap, and the second resource set is determined according to the resource reserved period Prx and the quantity of reserved periods Q.

The first resource set includes at least one resource possibly used by the apparatus, and the second resource set includes at least one resource possibly used by the second terminal.

According to an aspect of the application, a terminal device is provided, and the terminal device includes a processor; a transceiver connected to the processor; a memory for storing executable instructions for the processor. The processor is configured to load and execute the executable instructions to implement the resource exclusion method in the aspects.

According to an aspect of the application, a computer-readable storage medium is provided, and executable instructions are stored in the readable storage medium. The executable instructions are loaded and executed by the processor to implement the resource exclusion method in the aspects.

The technical solutions provided in the embodiments of the application include at least beneficial effects as follows.

A quantity of reserved periods Q of a second terminal is determined according to a resource reserved period Prx and a threshold Tscal. When a first resource set and a second resource set overlap, a target resource in the first resource set is excluded from a candidate resource set in a resource selection window. The second resource set is determined according to the resource reserved period Prx and the quantity of reserved periods Q. Since the threshold Tscal is determined according to a predetermined value, it is ensured that the finally determined quantity of reserved periods Q is within a certain range, thereby preventing the problem of excluding too many resources in the resource selection window.

BRIEF DESCRIPTION OF THE DRAWING

In order to illustrate the objective, the technical solutions, and the advantages in the embodiments of the application more clearly, the implementations of the application with reference to the drawings are further illustrated in details in the subsequent paragraphs.

DESCRIPTION OF THE EMBODIMENTS

In order to make the objectives, technical solutions and advantages of the application clearer, the embodiments of the application will be further described in detail below with reference to the accompanying drawings.

First, terms involved in the embodiments of the application are briefly introduced as follows.

Vehicle to everything (V2X): a key technology of the future intelligent transportation system, which mainly studies the vehicle data transmission scheme according to the 3GPP communication protocol. V2X communication includes vehicle to vehicle (V2V) communication, vehicle to infrastructure (V2I) communication, and vehicle to people (V2P) communication. V2X applications may improve driving safety, reduce congestion and vehicle energy consumption, improve traffic efficiency, and the like.

Figure 1:
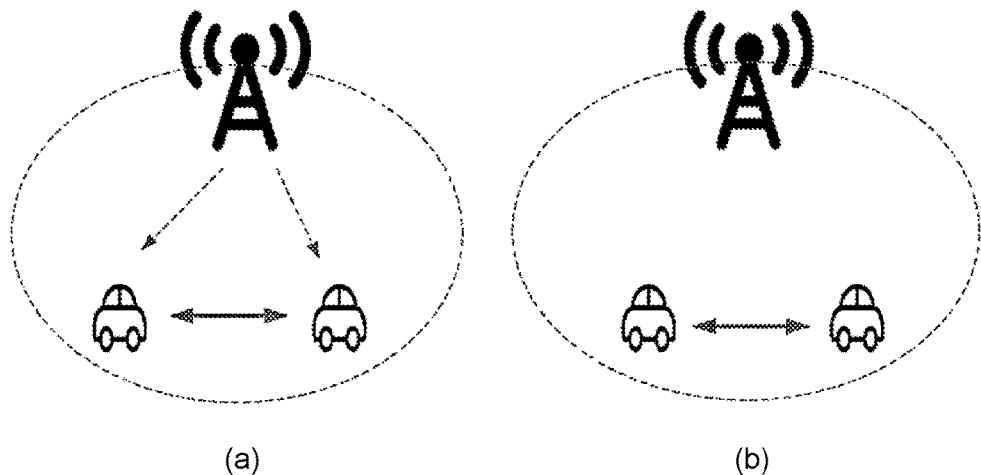
FIG. 1 is a schematic view of a transmission mode of a sidelink in a related art of the application.

Sidelink (SL) transmission: a device-to-device communication method with high spectral efficiency and low transmission delay. Two transmission modes of the sidelink are defined in 3GPP: mode A and mode B. As shown in (a) in FIG. 1, in mode A, resources used by a terminal during transmission are allocated by a base station through a downlink, and the terminal transmits data on a sidelink according to the resources allocated by the base station; the base station may allocate resources for a single transmission to the terminal or may allocate resources for semi-static transmission to the terminal. As shown in (b) of FIG. 1, in mode B, a terminal selects a resource in a resource pool to transmit data by itself. Specifically, the terminal may select transmission resources from the resource pool by means of listening or select transmission resources from the resource pool by means of random selection.

In new radio (NR)-V2X, autonomous driving requires to be supported, so higher requirements are put forward for data interaction between vehicles, such as higher throughput, lower delay, and higher reliability, greater coverage, more flexible resource allocation, and the like.

Figure 2:
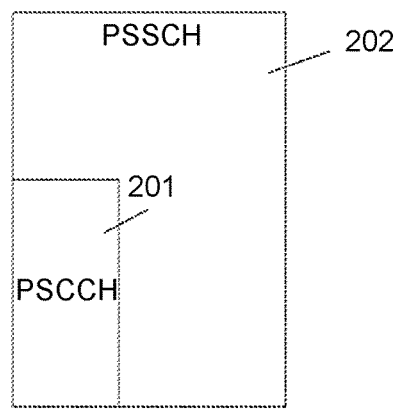
FIG. 2 is a block diagram of a physical layer structure of NR-V2X in a related art of the application.

In the physical layer structure of NR-V2X as shown in FIG. 2, a physical side-link control channel (PSCCH) 201 for transmitting control information is included in the physical side-link shared channel (PSSCH) 202 for transmitting data, and this also means that PSCCH 201 and PSSCH 202 have to be sent at the same time. Therefore, according to the third generation partnership project (3GPP) standard, only the initial transmission of the current transport block (TB) is supported to reserve the retransmission of the current TB, the retransmission of the current TB reserves the retransmission of the current TB, and the initial transmission or retransmission of the previous TB reserves the initial transmission or retransmission of the current TB.

Figure 3:
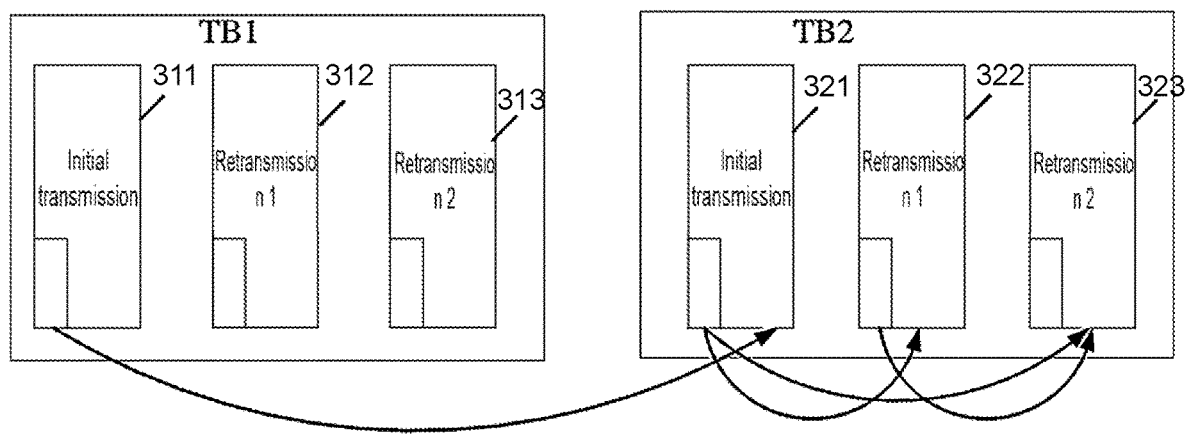
FIG. 3 is a block diagram of resource reservation within a TB or between TBs in a related art of the application.

As shown in FIG. 3, retransmission 1 and retransmission 2 of TB 2 are reserved for the initial transmission of TB 2, and retransmission 2 of TB 2 is reserved for retransmission 1 of TB 2. Resource reservation within the same TB is through two fields in the first sidelink control information transmitted in the PSCCH: it is indicated by time resource assignment and frequency resource assignment. Assuming that user equipment (UE) 1 monitors the initial transmission of TB 2 sent by UE 2, the UE1 decodes the two fields "time resource assignment" and "frequency resource assignment" in the first sidelink control information in the initially transmitted PSCCH, and then the time-frequency resource positions reserved by the UE 2 for sending retransmission 1 and retransmission 2 of TB 2 can be acquired. When the UE 1 selects resources, resource collision with the UE 2 can be prevented by excluding the resources reserved by the UE 2 for sending retransmission 1 and retransmission 2 of TB 2.

Meanwhile, in addition to the reservation within the same TB, NR V2X also supports resource reservation between two TBs. For example, in FIG. 3, the initial transmission of TB1 reserves the initial transmission of TB2, the retransmission 1 of TB1 reserves the retransmission 1 of TB2, and the retransmission 2 of TB1 reserves the retransmission 2 of TB2. Resource reservation between TBs is indicated by the resource reserved period field in the first sidelink control information transmitted in the PSCCH. Assuming that UE 1 monitors the initial transmission of TB 1 sent by the UE 2 and decodes the resource reserved period indicated by the "resource reservation period" field in the first sidelink control information in the PSCCH initially transmitted, by adding the time domain position of the initial transmission of the TB 1 monitored by the UE 2, the time domain position reserved by the UE 2 for sending the initial transmission of the TB 2 can be acquired. The frequency domain position of the initial transmission of TB 2 is the same as the frequency domain position of the initial transmission of TB 1, so UE 1 can acquire the time-frequency resource position reserved by UE 2 for sending the initial transmission of TB 2. Resource collision between UE1 and UE 2 may also be prevented by excluding the resources reserved by UE 2 for sending the initial transmission of TB 2.

In addition, the "resource reservation period" field in the first sidelink control information in the PSCCH of the initial transmission, and the retransmission 1 and retransmission 2 of TB 1 may not change, so in FIG. 3, the time domain intervals among the initial transmission of TB 1 and the initial transmission of TB 2, the retransmission 1 of TB 1 and the retransmission 1 of TB 2, and the retransmission 2 of TB 1 and the retransmission 2 of TB 2 are the same. Therefore, assuming that UE 1 monitors the initial transmission of TB 1 sent by UE 2, the retransmission 1 and retransmission 2 of TB 1 reserved by UE 2 and the time-frequency resource position of the initial transmission of TB 2 can be acquired by decoding the PSCCH. Meanwhile, the resource reservation intervals between TBs are the same, so the UE 1 can also calculate the time-frequency resource positions of the retransmission 1 and the retransmission 2 of the TB 2 reserved by the UE 2. Resource collision between UE1 and UE 2 can be prevented by excluding the corresponding resources.

In summary, when UE 1 works under the mode B, UE 1 can obtain the first sidelink control information sent by other UEs by monitoring PSCCHs sent by other UEs, so as to acquire the resources reserved by other UEs. When UE 1 selects resources, resources reserved by other UEs may be excluded, and thereby resource collision is prevented.

The configuration of the resource pool used by UE2 includes a (pre)configured resource reserved period set M. UE2 selects a resource reserved period from the set M and puts it into the "resource reservation period" field corresponding to the first sidelink control information thereof, so as to perform resource reservation between two TBs. In NR-V2X, the possible values of the resource reserved period are 0, [1, 99], 100, 200, 300, 400, 500, 600, 700, 800, 900, 1000 milliseconds, and the resource reserved period set M in the resource pool configuration includes 8 possible values thereof.

Resource Selection Method in NR-V2X

Figure 4:
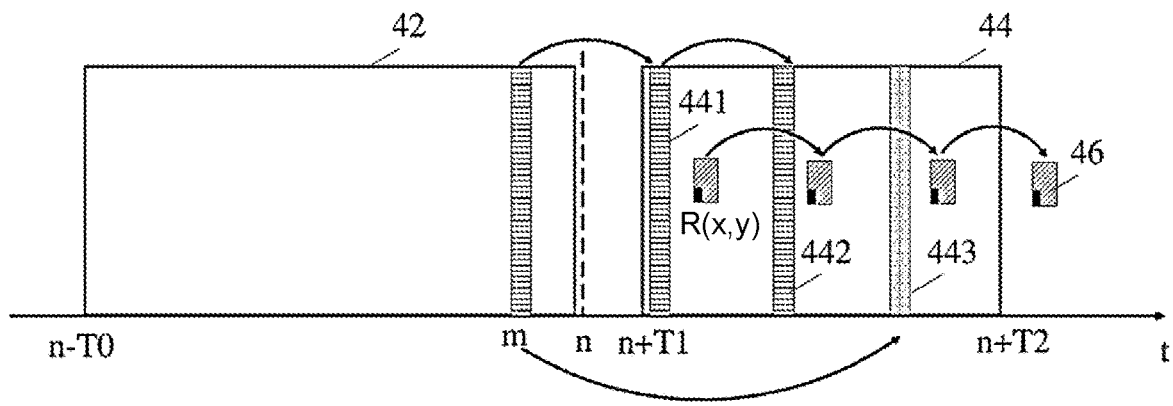
FIG. 4 is a schematic view of a resource selection method provided by an exemplary embodiment of the application.
Figure 5:
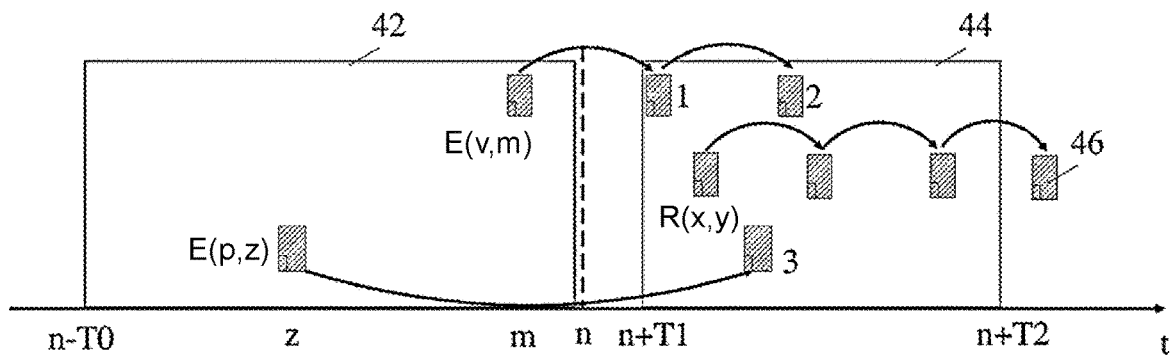
FIG. 5 is a schematic view of a resource selection method provided by an exemplary embodiment of the application.

As shown in FIG. 4 and FIG. 5, UE1 has a data packet of the service arriving at time n and requires performing resource selection. UE1 takes all the resources in a resource selection window 44 as a candidate resource set A, and any resource in the candidate resource set A is denoted as R(x, y), where x and y indicate the frequency domain position and time domain position of the resource, respectively.

The resource selection window starts at time n+T1 and ends at time n+T2, where $0<=T1<=T_{proc,\ 1}$, $T_{proc,\ 1}$ is the time for UE1 to select resources and prepare data, and $T2_{min}<=T2<=$ service delay requirement range. The value of $T2_{min}$ is $\{1, 5, 10, 20\}*2^\mu$ timeslots, where $\mu=0, 1, 2,$ and $3$ corresponds to the subcarrier spacing of 15 kHz, 30 kHz, 60 kHz, and 120 kHz, respectively. When $T2_{min}$ is greater than the service delay requirement range, T2 is equal to the service delay requirement range.

The terminal performs resource monitoring at time n-T0 to time n-$T_{proc}$, 0, and the value of T0 is 100 or 1100 milliseconds. $T_{proc,\ 0}$ is the time for the terminal to decode the control information.

Step 1: Resource Exclusion Process

In case 1, as shown in FIG. 4, if UE1 sends data in time slot m in the resource listening window without performing monitoring, UE1 may determine whether time slot m+q*Prxlg and resource R(x, y+j*Ptxlg) overlap (full and partial overlap). The "time slot m+q*Prxlg" is a set of resources that UE2 may use (has used or reserved), and UE2 is other terminals relative to UE1. The "resource R(x, y+j*Ptxlg)" is a set of resources that UE1 itself may use (select or reserve). If the two resource sets overlap, UE1 excludes the resource R(x, y) from the candidate resource set A.

For resource R(x, y+j*Ptxlg), j=0, 1, 2, 3 . . . C−1. C is determined by a random count value generated by UE1. When UE1 selects a resource, the random count value (a positive integer) may be generated to determine how many periods to reserve for the resource to be selected. Ptxlg is the quantity of Ptx converted into logical time slots, and Ptx is the resource reserved period determined by UE1, which is one of the values in the resource reserved period set M in the resource pool configuration used by UE1, and it is also the value indicated by the "resource reservation period" field in the first sidelink control information when UE1 sends data. Therefore, the resource R(x, y+j*Ptxlg) is the four resources 46 marked with diagonal lines in FIG. 4.

For time slots m+q*Prxlg, q=1, 2, 3 . . . Q, and Prxlg is the quantity of Prx converted into logical time slots. Normally, Prx is the resource reserved period indicated by "resource reservation period" in the first sidelink control information (sent by UE2) transmitted in the PSCCH monitored by UE1. However, UE1 does not perform monitoring in the time slot m, so Prx is all possible values in the resource reserved period set M in the resource pool configuration used by UE1, that is, UE1 may determine whether the time slot m+q*Prxlg calculated by each value of M is overlapped with the resource R(x, y+j*Ptxlg).

For Q, if Prx<Tscal and n−m<=Prxlg, then Q=⌈Tscal/Prx⌉ (representing rounding up); otherwise, the value of Q=1. For example, UE1 selects a Prx from the resource reserved period set M in the used resource pool configuration, if Prx<Tscal and n−m<=Prxlg, and the value of Q is calculated as 2, then the time slot m+q*Prxlg is two time slots 441 and 442 marked by horizontal lines and indicated by the time slot m in FIG. 4; otherwise Q=1, the time slot m+q*Prxlg is the time slot 443 marked by dots in FIG. 4.

In case 2, as shown in FIG. 5, if UE1 monitors PSCCH on a resource E(v, m) in time slot m in the listening window, where v is the frequency domain position of the resource E(v, m), then the RSRP of the PSCCH or the RSRP of the PSSCH scheduled by the PSCCH (i.e., the RSRP of the PSSCH sent simultaneously with the PSCCH) is measured. If the measured RSRP is greater than the SL-RSRP threshold, and UE1 determines that resource E(v, m+q*Prxlg) is overlapped with resource R(x, y+j*Ptxlg) (full overlap and partial overlap), then the corresponding resource is excluded from set A.

For resource R(x, y+j*Ptxlg), j=0, 1, 2, 3 . . . C−1. C is determined by a random count value generated by UE1. When UE1 selects a resource, the random count value may be generated to determine how many periods to reserve for the resource to be selected. Ptxlg is the quantity of Ptx converted into logical time slots, and Ptx is the resource reserved period determined by UE1. The resource R(x, y+j*Ptxlg) is the four resources 46 marked with diagonal lines in FIG. 5.

For time slots m+q*Prxlg, q=1, 2, 3 . . . Q, and Prxlg is the quantity of Prx converted into logical time slots. Prx is the resource reserved period indicated by "resource reservation period" in the first sidelink control information transmitted in the PSCCH monitored by UE1. For Q, if Prx<Tscal and n−m<=Prxlg, Q=⌈Tscal/Prx⌉ (representing rounding up); otherwise, Q=1. For example, as shown in FIG. 5, if UE1 monitors PSCCH in the time slot m and decodes that Prx<Tscal, and nm<=Prxlg, it is calculated that Q is equal to 2. Then the resource E(v, m+q*Prxlg) is the resource 1 and the resource 2 in FIG. 5. If UE1 monitors PSCCH on resource E(p, z) of time slot z, Prx is decoded, it is calculated that Q is 1, and then resource E(p, zq*Prxlg) is resource 3 in FIG. 5.

The forgoing description are the process in which UE1 performs resource exclusion according to monitoring the resource reserved period indicated in the "resource reservation period" field in the first sidelink control information transmitted in the PSCCH, the process in which UE1 excludes retransmission resources according to "time resource assignment" and "frequency resource assignment", and the process of excluding resources by performing calculation in combination with the three fields, and reference may be made to the description under FIG. 3.

If the remaining resources in the candidate resource set A are less than X % of the total resources in the candidate resource set A, the SL-RSRP threshold is increased by 3 dB, and step 1 is performed again.

Step 2: Resource Selection Process

After performing resource exclusion, UE1 randomly selects several resources from the candidate resource set A as resources used by UE1 during initial transmission and retransmission.

Note the following.

1. The RSRP threshold is determined by the priority P1 carried in the PSCCH monitored by the UE1 and the priority P2 of the data to be sent by the UE1. The UE1 acquires an SL-RSRP threshold table through network configuration or pre-configuration, where the SL-RSRP threshold table includes SL-RSRP thresholds corresponding to all priority combinations.

For example, as shown in Table 1, assuming that the optional values of priority P1 and priority P2 are both 0-7, the SL-RSRP thresholds corresponding to different priority combinations are represented by $y_{ij}$, where i in $y_{ij}$ is the value of the priority P1, and j is the value of the priority P2.

TABLE 1

| P2 | P1 | | | | | | | |
|---|---|---|---|---|---|---|---|---|
| | 0 | 1 | 2 | 3 | 4 | 5 | 6 | 7 |
| 0 | $y_{00}$ | $y_{01}$ | $y_{02}$ | $y_{03}$ | $y_{04}$ | $y_{05}$ | $y_{06}$ | $y_{07}$ |
| 1 | $y_{10}$ | $y_{11}$ | $y_{12}$ | $y_{13}$ | $y_{14}$ | $y_{15}$ | $y_{16}$ | $y_{17}$ |
| 2 | $y_{20}$ | $y_{21}$ | $y_{22}$ | $y_{23}$ | $y_{24}$ | $y_{25}$ | $y_{26}$ | $y_{27}$ |
| 3 | $y_{30}$ | $y_{31}$ | $y_{32}$ | $y_{33}$ | $y_{34}$ | $y_{35}$ | $y_{36}$ | $y_{37}$ |
| 4 | $y_{40}$ | $y_{41}$ | $y_{42}$ | $y_{43}$ | $y_{44}$ | $y_{45}$ | $y_{46}$ | $y_{47}$ |
| 5 | $y_{50}$ | $y_{51}$ | $y_{52}$ | $y_{53}$ | $y_{54}$ | $y_{55}$ | $y_{56}$ | $y_{57}$ |
| 6 | $y_{60}$ | $y_{61}$ | $y_{62}$ | $y_{63}$ | $y_{64}$ | $y_{65}$ | $y_{66}$ | $y_{67}$ |
| 7 | $y_{70}$ | $y_{71}$ | $y_{72}$ | $y_{73}$ | $y_{74}$ | $y_{75}$ | $y_{76}$ | $y_{77}$ |

When UE1 monitors the PSCCH sent by UE2, the priority P1 carried in the first sidelink control information transmitted in the PSCCH and the priority P2 of the data packet to be sent are acquired, and UE1 determines the SL-RSRP threshold by looking up Table 1.

2. Whether the UE1 uses the measured PSCCH-RSRP or the PSSCH-RSRP scheduled by the PSCCH to compare with the SL-RSRP threshold depends on the resource pool configuration of the resource pool used by the UE1. The configuration of the resource pool can be network configuration or pre-configured.

3. Regarding that the Prxlg/Ptxlg are the quantity of Prx/Ptx converted into logical time slots, respectively: assuming that a time slot is equal to 1 millisecond and Prx is 5 milliseconds, among these 5 time slots, 2 time slots may be downlink time slots in a TDD mode or time slots for sending synchronization signals, and these time slots are not included in the resource pool of sidelink, so it requires to convert the 5 milliseconds represented by Prx into 3 time slots of logical time slots, namely Prxlg.

Re-Evaluation and Resource Pre-Emption Mechanisms

In addition, NR-V2X also supports reselection of the selected resources after resource selection and before sending initial transmission.

Figure 6:
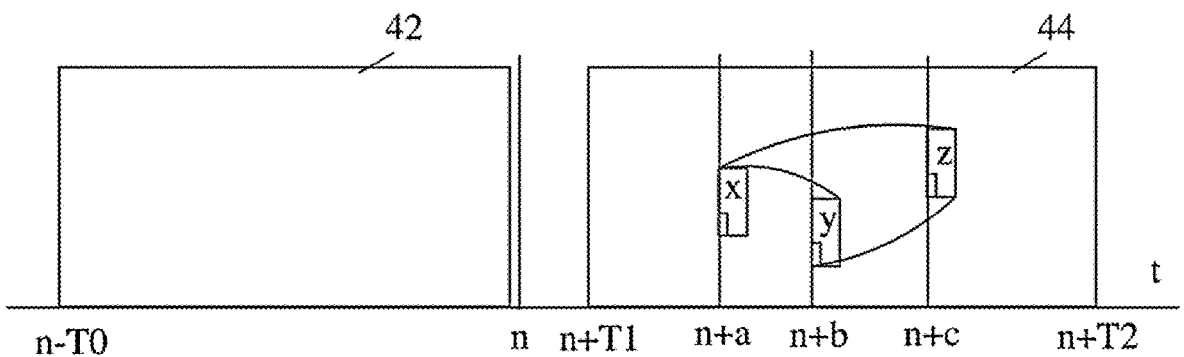
FIG. 6 is a schematic view of a resource selection method provided by an exemplary embodiment of the application.

As shown in FIG. 6, UE1 has a data packet of the service arriving at the time n and determines the resource listening window and resource selection window of the resource for resource selection, and UE1 selects an initial transmission resource x at time n+a, and the retransmission resources y and z at time n+b and time n+c. After time n, UE1 may continue to monitor the PSCCH. Before time n+a, if UE1 discovers that the resource x or the resource y or the resource z is reserved by other UE1 (i.e., resource conflict occurs) through continuous monitoring, and the measured SL-RSRP is greater than the RSRP threshold, UE1 may release the corresponding resources, and on the premise of meeting the service delay requirements, the corresponding resources or all resources are reselected. After time n+a, UE1 has already sent PSCCH and PSSCH on the resource x and reserved the resources y and z, so only when UE1 finds that a high-priority UE preempts the resource y or the resource z through continuous monitoring, and the measured PSCCH-RSRP or PSSCH-RSRP is greater than the SL-RSRP threshold, then the terminal performs resource reselection for the preempted resources. Meanwhile, the SL-RSRP threshold is also determined by the priority P1 in the PSCCH monitored by the terminal and the priority P2 of the data to be sent by the terminal.

Note that in the three cases of the resource selection performed at time n by the terminal, resource selection in the re-evaluation process, and resource selection for preempted resources, the SL-RSRP thresholds may be the same or different.

According to the foregoing description, whether UE 1 does not monitor resources at time slot m, or UE 1 monitors PSCCH sent by UE2 (generally referring to other UEs) at time slot m, time slot m+q*Prxlg requires calculating, and thereby it is determined whether the corresponding resource on the time slot m+q*Prxlg or the time slot m+q*Prxlg is overlapped with the candidate resource in the resource selection window. In NR-V2X, the value of Prx can be any value from 1-99 ms, assuming that a time slot is equal to 1 ms, Prx=2 ms and Prxlg=2, Tscal=50 ms, then Q=⌈Tscal/Prx⌉=25, then the time slot m+q*Prxlg corresponds to 25 time slots or resources on the 25 time slots, and the timeslot m+q*Prxlg occurs once every 2 time slots in the 25 timeslots or the resources on the 25 timeslots. This results in the exclusion of a large number of resources in the candidate resource set A. The embodiment of the application provides a resource exclusion solution capable of preventing the problem.

Figure 7:
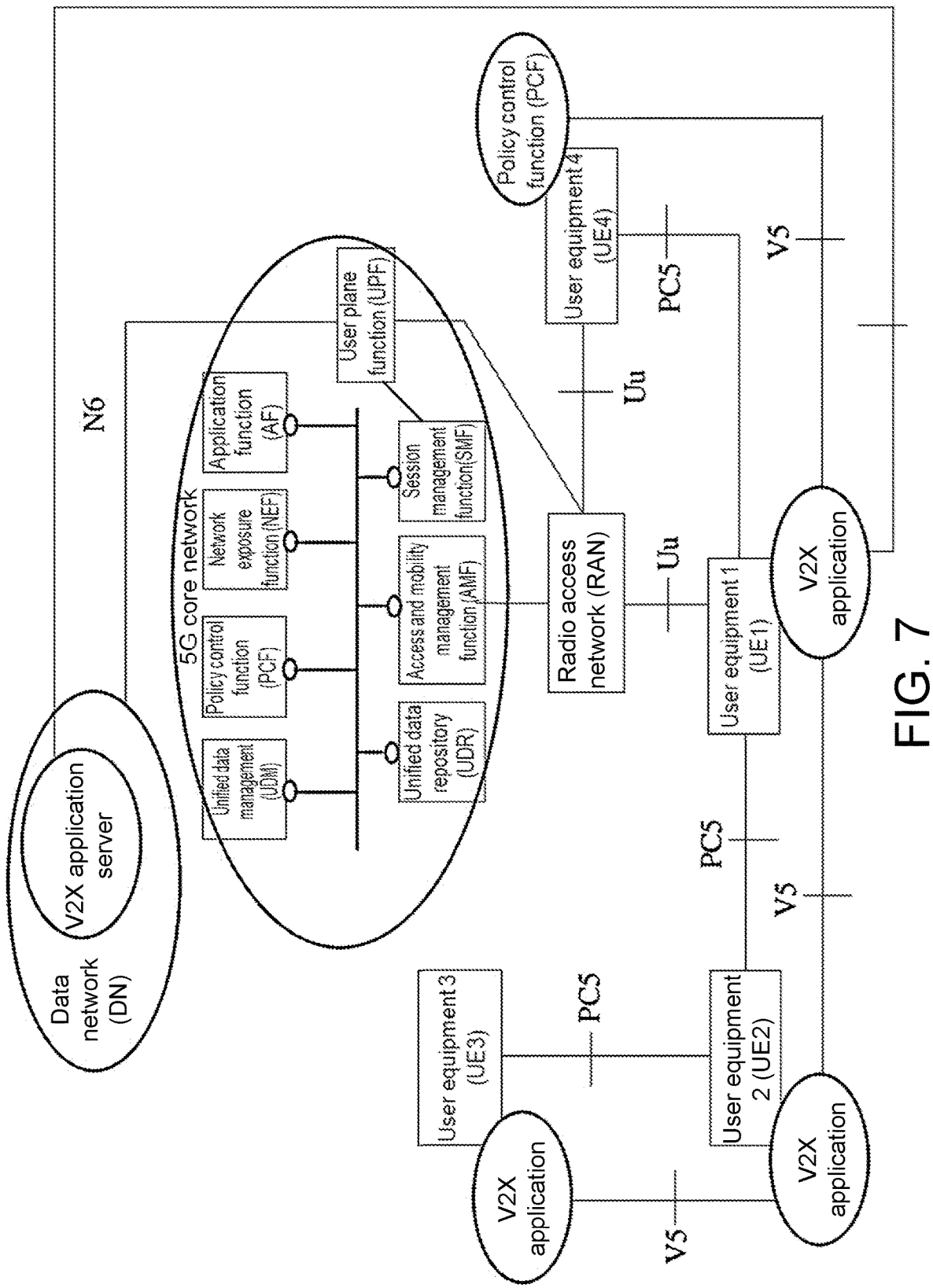
FIG. 7 is a block diagram of a communication system supporting sidelink transmission provided by an exemplary embodiment of the application.

FIG. 7 is a block diagram of a communication system supporting sidelink transmission provided by an exemplary embodiment of the application. The communication system may be a schematic view of a non-roaming 5G system architecture, and the system architecture can be applied to V2X services using D2D technology.

The system architecture includes a data network (DN), and a V2X application server required for the V2X service is disposed in the data network. The system architecture also includes a 5G core network, and the network functions of the 5G core network include unified data management (UDM), policy control function (PCF), network exposure function (NEF), application function (AF), unified data repository (UDR), access and mobility management function (AMF), session management function (SMF), and user plane function (UPF).

The system architecture further includes a new generation-radio access network (NG-RAN) and four pieces of exemplary user equipment (i.e., user equipment 1 to user equipment 4). Each user equipment is configured with a V2X application. One or more access network devices, such as a base station (gNB), are disposed in the NG-RAN. The user equipment performs uplink transmission to the access network equipment.

In the system architecture, the data network and the user plane function in the 5G core network are connected through the N6 reference point, and the V2X application server and the V2X application in the user equipment are connected through the V1 reference point; the NG-RAN is connected to the AMF and the UPF in the 5G core network, and the NG-RAN is connected to the user equipment 1 and the user equipment 5 through the Uu reference point respectively; sidelink transmission is performed among multiple pieces of user equipment through the PC5 reference point, and multiple V2X applications are connected through the V5 reference point. The reference points may also be referred to as "interfaces".

Figure 8:
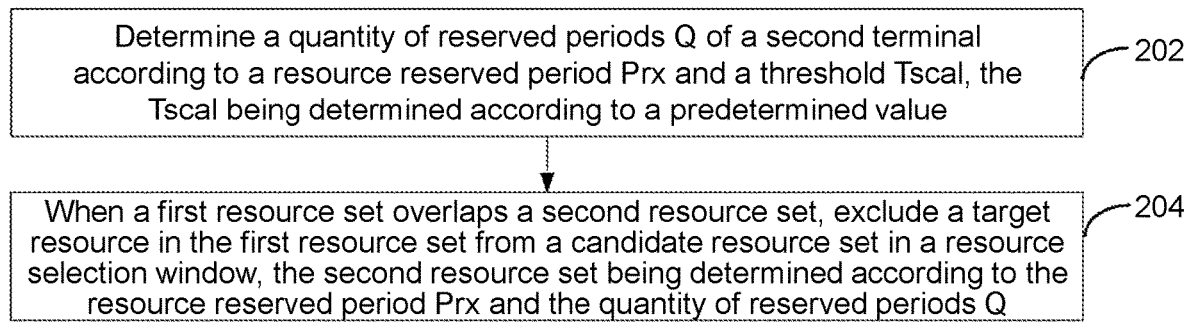
FIG. 8 is a flowchart of a resource exclusion method provided by an exemplary embodiment of the application.

FIG. 8 is a flowchart of a resource exclusion method provided by an exemplary embodiment of the application. The embodiment is illustrated by applying the method to the user equipment 1 shown in FIG. 7, where the user equipment 1 is referred to as the first terminal or UE1, and the user equipment 2 is referred to as the second terminal or UE2. The method includes steps as follows.

Step 202: determine a quantity of reserved periods Q of the second terminal according to the resource reserved period Prx and the threshold Tscal.

The quantity of reserved periods Q of the second terminal is cooperatively determined according to the resource reserved period Prx and the threshold Tscal. The second terminal refers to the transmitting terminal of the PSCCH monitored by the first terminal in the resource listening window, or the second terminal is the terminal that may transmit the PSCCH in the unmonitored time slot in the resource listening window by the first terminal. In the latter scenario, the second terminal may not actually exist, but only predicted to be existing by the first terminal. The second terminal generally refers to other terminals relative to the first terminal, and there may be one or more second terminals.

The resource reserved period Prx is the resource reserved period of the second terminal determined by the first terminal.

When the first terminal does not monitor the time slot m in the resource listening window, the resource reserved period Prx is all values (i.e., predicting all possible values) in the resource reserved period set M configured by the resource pool used by the first terminal. Exemplarily, the possible values of the resource reserved period include 0, [1, 99], 100, 200, 300, 400, 500, 600, 700, 800, 900, 1000 milliseconds, and the resource reserved period set M in the resource pool configuration includes 8 values thereof.

When the first terminal monitors in the resource listening window that the time slot m is the time slot to which the first resource belongs, when the first resource is a resource scheduled by the PSCCH that the first terminal monitors in the resource listening window and the RSRP measurement value is greater than the threshold, Prx is the resource reserved period indicated by the "resource reservation period" field in the sidelink control information transmitted in the PSCCH monitored by the first terminal, and the sidelink control information is sent by the second terminal.

The threshold Tscal is determined according to a predetermined value. In one possible design, the threshold Tscal is equal to the predetermined value. That is, the threshold Tscal is equal to one of T2, $T2_{min}$, the service delay requirement range, the difference between T2 and T1, and 100 milliseconds.

Alternatively, the predetermined value is a value related to T2. The predetermined value includes at least one of T2, $T2_{min}$, the service delay requirement range, the difference between T2 and T1, and 100 milliseconds.

T2 is the difference between the end time of the resource selection window and time n, and time n is the arrival time of the data packet of the service; $T2_{min}$ is the lower limit of the value of T2; T1 is the difference between the start time of the resource selection window and time n.

Alternatively, the service delay requirement range is dynamically changed according to the scenario. Taking the service delay requirement range of 50 milliseconds as an example, the data transmission should be completed before time n+50. In the process of resource reselection or resource preemption, resource reselection is performed at a certain time, and the delay requirement range refers to the remaining delay requirement range. For example, a data packet of the service arrives at time n, the service delay requirement is 50 ms, resource reselection is performed at time n+20, and the service delay requirement range at this time refers to the remaining 30 ms.

Step 204: when the first resource set and the second resource set overlap, exclude a target resource in the first resource set from the candidate resource set in the resource selection window, and the second resource set is determined according to the resource reserved period Prx and a quantity of reserved periods Q.

The first resource set includes at least one resource that may be used by the first terminal, and the second resource set includes at least one resource that may be used by the second terminal.

The first terminal determines the first resource set and the second resource set when the service data packet arrives at time n.

The first resource set is determined according to any resource R(x, y) in the resource selection window, where x represents the frequency domain position of the resource R, and y represents the time domain position of the resource R. The first resource set includes at least one of resources that may be selected by the first terminal and resources that may be reserved by the first terminal.

Exemplarily, the first resource set includes resource R(x, y+j*Ptxlg), j=0, 1, 2, 3 ... C−1. C is determined by a random count value generated by the first terminal. Ptxlg is the quantity of Ptx after Ptx is converted into logical time slots, and Ptx is the resource reserved period determined by the first terminal. The value range of Ptx is one of the resource reserved period sets M configured by the resource pool used by the first terminal.

Exemplarily, the possible values of the resource reserved period include 0, [1, 99], 100, 200, 300, 400, 500, 600, 700, 800, 900, 1000 milliseconds, and the resource reserved period set M in the resource pool configuration includes 8 possible values thereof.

The second resource set is determined according to the time slot m, where the time slot m is a time slot that the first terminal does not monitor, or the time slot m is a time slot to which the first resource belongs, and the first resource is a resource scheduled by PSCCH monitored by the first terminal in the resource listening window and whose RSRP measurement value is greater than the threshold. The second resource set includes at least one of resources that may be used by the second terminal and resources that may be reserved by the second terminal.

That is, the first resource is the time-frequency resource scheduled by the PSCCH monitored by the first terminal in the resource listening window, and the first resource is the time-frequency resource for which the RSRP measurement value is greater than the threshold. Alternatively, "the RSRP measurement value is greater than the threshold" means that the RSRP measurement value of the PSCCH for scheduling the first resource is greater than the threshold, or the RSRP measurement value of the PSSCH in the first resource is greater than the threshold.

Illustratively, the threshold is the SL-RSRP threshold looked up in Table 1 by the priority P1 carried in the sidelink control information transmitted in the PSCCH monitored by the first terminal in the resource listening window and the priority P2 of the data packet to be sent.

Exemplarily, the second resource set includes time slots m+q*Prxlg, q=1, 2, 3 ... Q, where Prxlg is the quantity of the resource reserved period Prx converted into logical time slots.

When the first resource set and the second resource set completely overlap or partially overlap, the first terminal excludes the target resource in the first resource set from the candidate resource set in the resource selection window.

The target resource is all or part of the resource in the first resource set. For example, the target resource is the first resource in the time domain in the first resource set, that is, R(x, y). In another example, the target resource is at least one resource in the first resource set that belongs to the candidate resource set. In another example, the target resource is all resources in the first resource set.

In summary, in the method provided in the embodiment, a quantity of reserved periods Q of a second terminal is determined according to a resource reserved period Prx and a threshold Tscal; when a first resource set and a second resource set overlap, a target resource in the first resource set is excluded from a candidate resource set in a resource selection window, and the second resource set is determined according to the resource reserved period Prx and the quantity of reserved periods Q. Since the threshold Tscal is determined according to a predetermined value, it is ensured that the finally determined quantity of reserved periods Q is within a certain range, thereby preventing the problem of excluding too many resources in the resource selection window.

Figure 9:
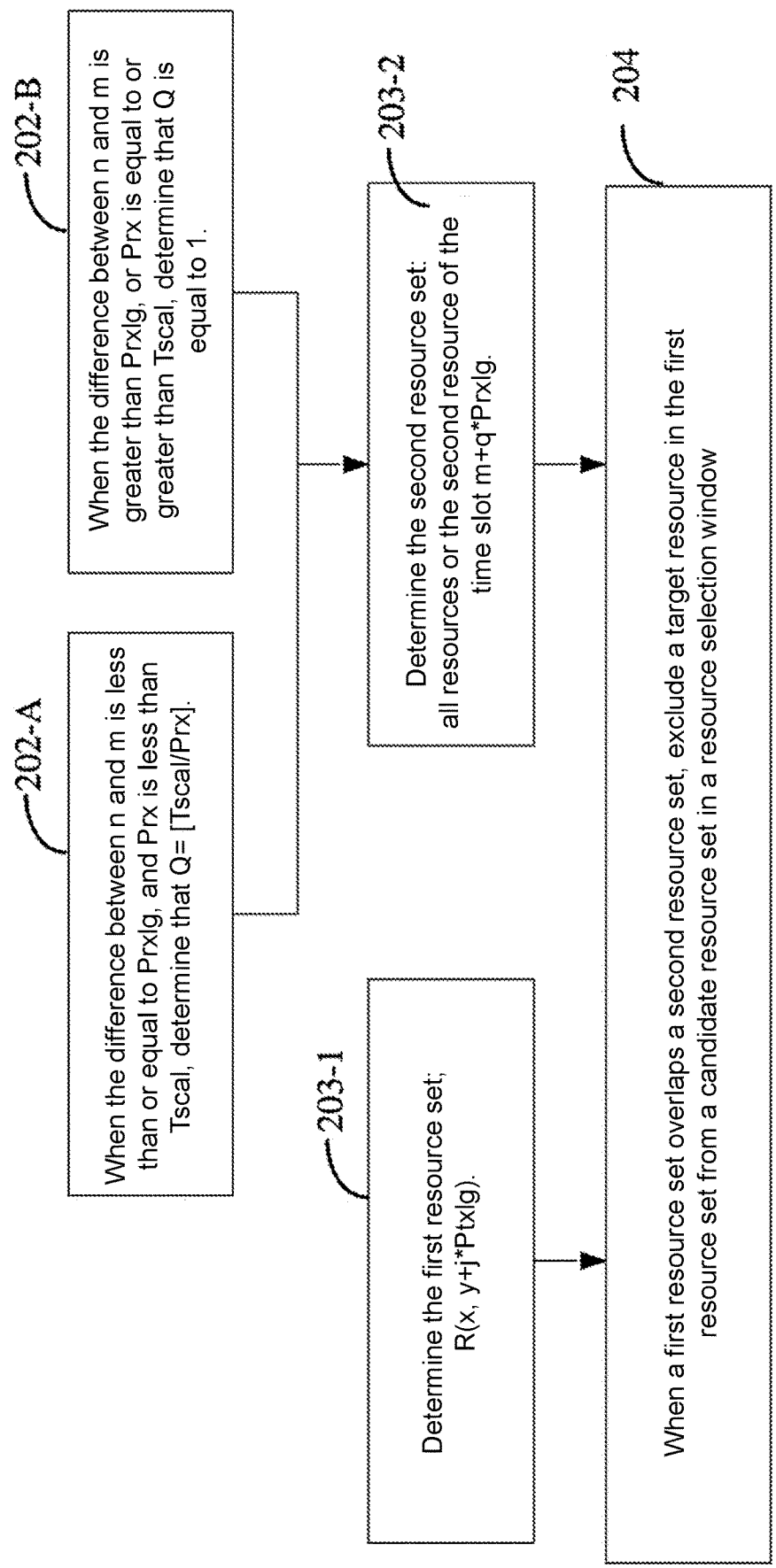
FIG. 9 is a flowchart of a resource exclusion method provided by an exemplary embodiment of the application.

In an optional embodiment according to FIG. 8, step 202 can be implemented as step 202-A and step 202-B, and step 203-1 and step 203-2 can also be added, as shown in FIG. 9.

Step 202-A: when the difference between time n and time m is less than or equal to the quantity of logical time slots Prxlg, and the resource reserved period Prx is less than the threshold Tscal, it is determined that the quantity of reserved periods Q is equal to the quotient of the threshold Tscal and the resource reserved period Prx rounded up.

Time n is the arrival time of the data packet of the service, and time m is the time corresponding to time slot m. Prxlg is the quantity of logical time slots corresponding to the resource reserved period Prx.

That is, if Prx<Tscal and nm<=Prxlg, then Q=⌈Tscal/Prx⌉ (representing rounding up).

Step 202-B: when the difference between time n and time m is greater than the quantity of logical time slots Prxlg, or when the resource reserved period Prx is equal to or greater than the threshold Tscal, it is determined that the quantity of reserved periods Q is equal to 1.

That is, if Prx>=Tscal, or if nm>Prxlg, then Q=1.

Step 203-1: determine the first resource set; R(x, y+j*Ptxlg).

j=0, 1, 2, 3 ... C−1. C is determined by a random count value generated by the first terminal. Ptxlg is the quantity of Ptx after Ptx is converted into logical time slots, and Ptx is a resource reserved period determined by the first terminal itself. The value range of Ptx is one of the resource reserved period sets M configured by the resource pool used by the first terminal.

Step 203-2: determine the second resource set: all resources of the time slot m+q*Prxlg or the second resource.

q=1, 2, 3 ... Q. Prxlg is the quantity of the resource reserved period Prx converted into logical time slots.

In a possible embodiment, the time slot m is a time slot that the first terminal does not monitor in the resource listening window; at this time, the second resource set includes all resources of the time slot m+q*Prxlg.

In a possible embodiment, the time slot m is a time slot to which the first resource belongs, and the first resource is a resource scheduled by the PSCCH that the apparatus monitors in the resource listening window and whose RSRP measurement value is greater than a threshold. The second resource set includes the second resource in the time slot m+q*Prxlg, and the second resource and the first resource have the same frequency domain position.

For ⌈Tscal/Prx⌉, even after the threshold Tscal is determined, if Prx is small, a large Q may be generated. To limit the upper limit of the value of the quantity of reserved periods Q, when the resource reserved period Prx is less than the parameter a. That is, when the resource reserved period Prx is small, it is determined that the quantity of reserved periods Q is also a small value. The step 202 also has at least three different optional implementations (in no particular order) as follows.

In the first implementation, the resource reserved period Prx and the threshold Tscal are positively related. For example, the threshold Tscal is equal to the product of the modification factor β and the predetermined value, and the modification factor β is positively related to the resource reserved period Prx. That is, the smaller the Prx, the smaller the modification factor β.

In the second implementation, when the resource reserved period Prx is less than the parameter a, the first terminal adjusts the resource reserved period Prx to be equal to the parameter a, and the quantity of reserved periods Q of the second terminal is determined according to the adjusted resource reserved period Prx.

In the third implementation, when the resource reserved period Prx is less than the parameter a, the first terminal generates a random count value; according to the random count value, the quantity of the reserved periods Q of the second terminal is determined.

For the First Implementation

Let the resource reserved period Prx are positively related with the threshold Tscal. For example, the threshold Tscal is equal to the product of the modification factor β and the predetermined value, and the modification factor β is positively related to the resource reserved period Prx. That is, the smaller the Prx, the smaller the modification factor β. The relationship between the modification factor β and the resource reserved period Prx may be defined by a table or by a function. Illustratively, the value range of the modification factor β is (0, 1), but the case where β is greater than 1 is not excluded.

The relationship between the modification factor β and the resource reserved period Prx may be configured by the network device, or may be pre-configured, or may be based on the implementation of the UE itself.

In summary, in the method provided in the embodiment, by setting the threshold Tscal equal to the predetermined value, or setting the threshold Tscal equal to the product of the modification factor β and the predetermined value, the modification factor β and the resource reserved period Prx are positively correlated, so that when the value of Prx is small, Q=⌈Tscal/Prx⌉ is also small, and therefore the value of the quantity of reserved periods Q is generally limited to be not too large, so that there are not too many resources in the second resource set, the conflict between the first resource set and the second resource set is prevented, and the problem of more resources in the candidate resource set may be excluded.

For the Second Implementation

Figure 10:
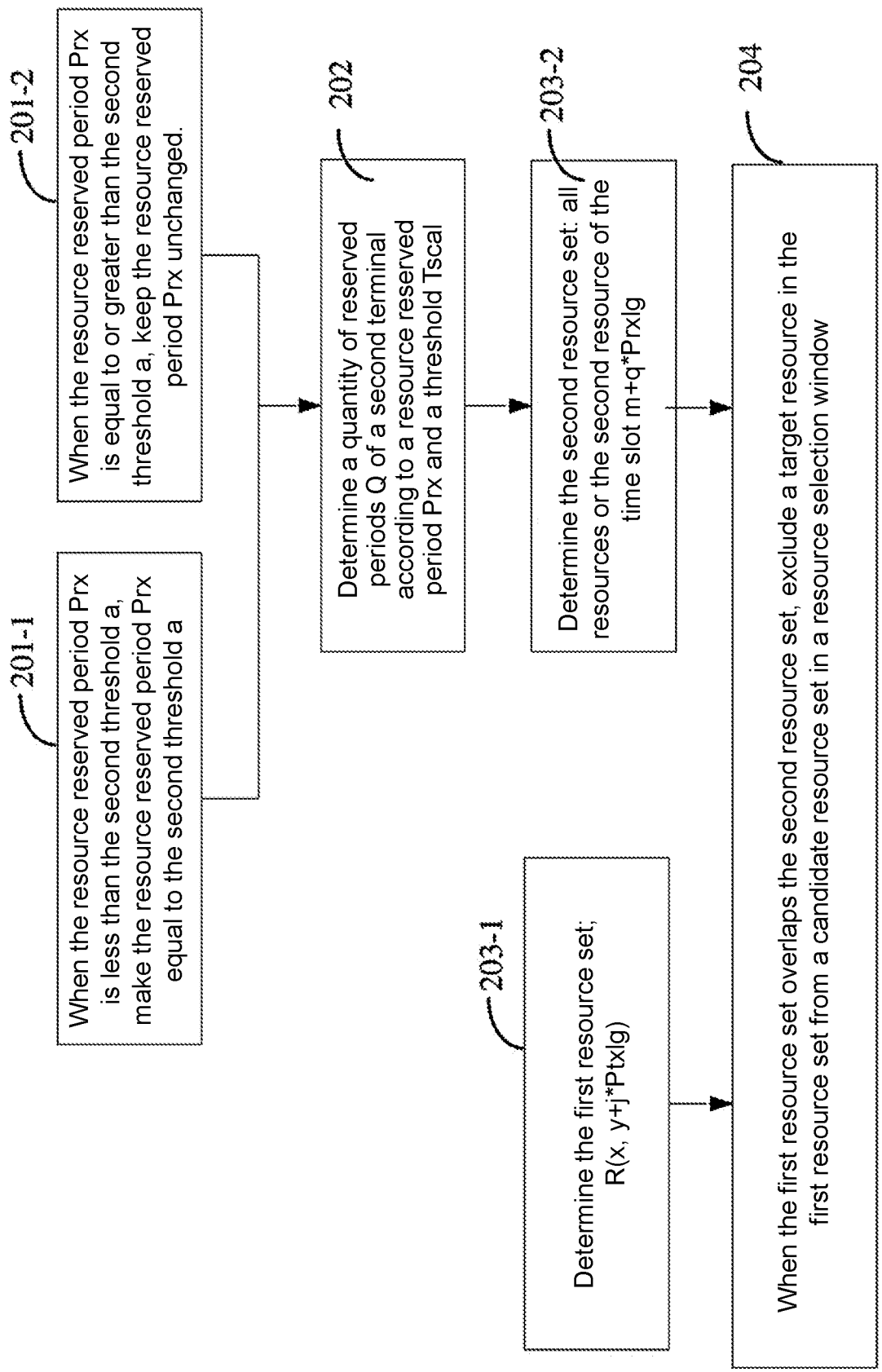
FIG. 10 is a flowchart of a resource exclusion method provided by an exemplary embodiment of the application.

In an optional embodiment according to FIG. 8, step 201-1, step 201-2, step 203-1, and step 203-2 may also be added, as shown in FIG. 10.

Step 201-1: when the resource reserved period Prx is less than the parameter a, make the resource reserved period Prx equal to the parameter a.

The parameter a is a predetermined empirical value. For example, a is an integer multiple of Prx.

The parameter a may be configured by the network device, or may be pre-configured, or may be based on the implementation of the UE itself.

Step 201-2: when the resource reserved period Prx is equal to or greater than the parameter a, keep the resource reserved period Prx unchanged.

Step 202: according to the resource reserved period Prx and the threshold Tscal, determine the quantity of reserved periods Q of the second terminal.

If Prx<Tscal and n−m<=Prxlg, then Q=⌈Tscal/Prx⌉.

If Prx>=Tscal, or n−m>Prxlg1, then Q=1.

Step 203-1: determine the first resource set; R(x, y+j*Ptxlg).

j=0, 1, 2, 3 . . . C−1. C is determined by a random count value generated by the first terminal. Ptxlg is the quantity of Ptx after Ptx is converted into logical time slots, and Ptx is a resource reserved period determined by the first terminal itself. The value range of Ptx is one of the resource reserved period sets M configured by the resource pool used by the first terminal.

Step 203-2: determine the second resource set: all resources or the second resource of the time slot m+q*Prxlg.

q=1, 2, 3 . . . Q. Prxlg is the quantity of the resource reserved period Prx converted into logical time slots.

In a possible embodiment, the time slot m is a time slot that the first terminal does not monitor in the resource listening window; at this time, the second resource set includes all resources of the time slot m+q*Prxlg.

In a possible embodiment, the time slot m is a time slot to which the first resource belongs, and the first resource is a resource scheduled by the PSCCH that the apparatus monitors in the resource listening window and whose RSRP measurement value is greater than a threshold. The second resource set includes the second resource in the time slot m+q*Prxlg, and the second resource and the first resource have the same frequency domain position.

In summary, in the method provided by the embodiment, when the resource reserved period Prx is less than the parameter a, the resource reserved period Prx is set equal to the parameter a, so that when the value of Prx is small, Q=⌈Tscal/Prx⌉ may also be relatively small. Therefore, the value of the reserved period Q is limited to be not too large, so that there are not too many resources in the second resource set, the conflict between the first resource set and the second resource set is prevented, and the problem of more resources in the candidate resource set may be excluded.

For the Third Implementation

Figure 11:
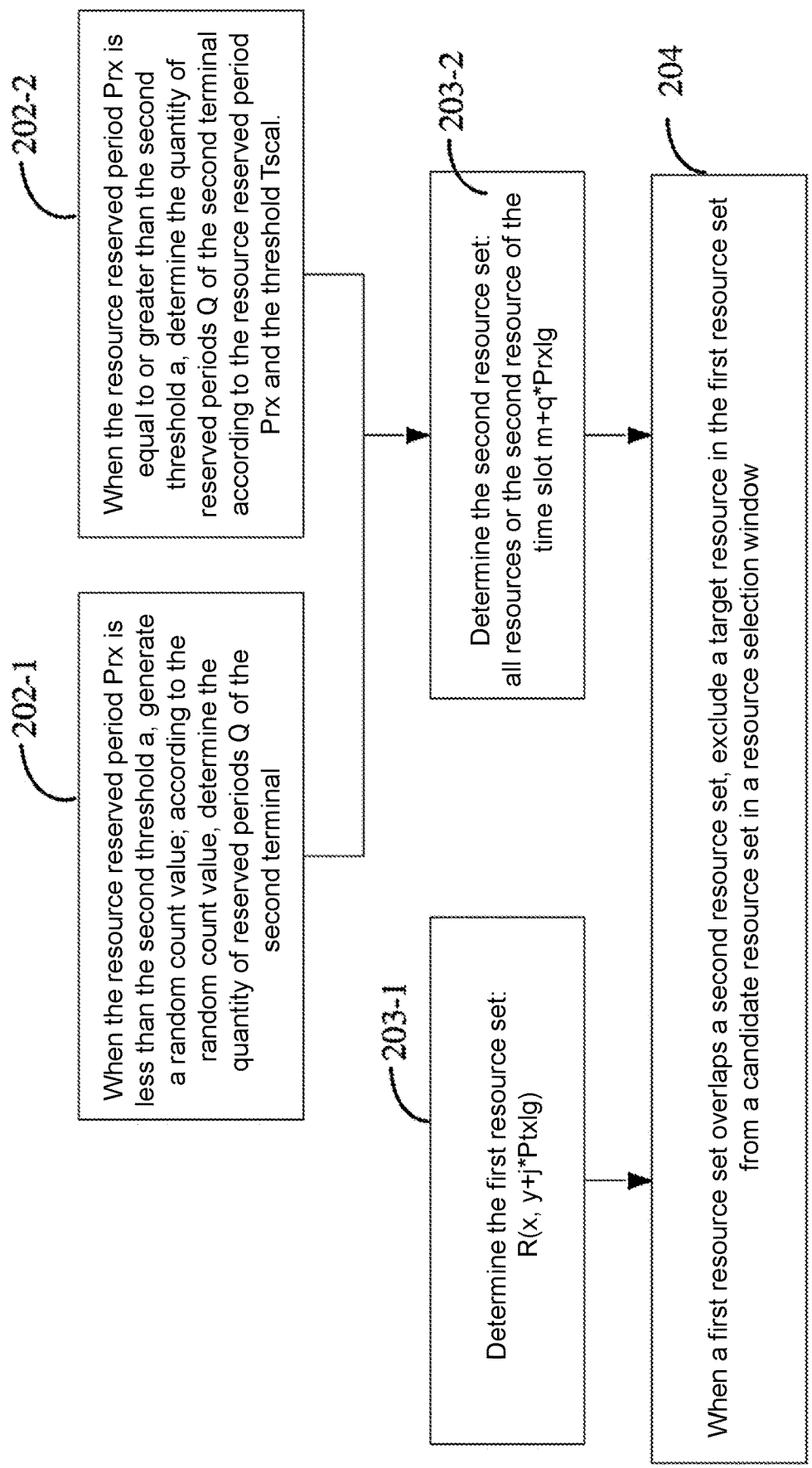
FIG. 11 is a flowchart of a resource exclusion method provided by an exemplary embodiment of the application.

In an optional embodiment according to FIG. 8, step 202 can be implemented as step 202-1 and step 202-2, and step 203-1 and step 203-2 can also be added, as shown in FIG. 11.

Step 202-1: when the resource reserved period Prx is less than the parameter a, generate a random count value; according to the random count value, determine the quantity of reserved periods Q of the second terminal.

The parameter a is a predetermined empirical value. For example, a is an integer multiple of Prx.

The parameter a may be configured by the network device, or may be pre-configured, or may be based on the implementation of the UE itself.

When the resource reserved period Prx is less than the parameter a, the first terminal generates a random count value; according to the random count value, the quantity of reserved periods Q of the second terminal is determined.

Step 202-2: when the resource reserved period Prx is equal to or greater than the parameter a, determine the quantity of reserved periods Q of the second terminal according to the resource reserved period Prx and the threshold Tscal.

If Prx<Tscal and n−m<=Prxlg, then Q=⌈Tscal/Prx⌉.

If Prx>=Tscal, or n−m>Prxlg1, then Q=1.

Step 203-1: determine the first resource set: R(x, y+j*Ptxlg).

j=0, 1, 2, 3 . . . C−1. C is determined by a random count value generated by the first terminal. Ptxlg is the quantity of Ptx after Ptx is converted into logical time slots, and Ptx is a resource reserved period determined by the first terminal itself. The value range of Ptx is one of the resource reserved period sets M configured by the resource pool used by the first terminal.

Note that when the first terminal determines C, C is also determined by generating a random count value.

It is assumed that the random count value in step 202-1 is the first random count value, and the random count value in step 203-1 is the second random count value. The first random count value and the second random count value are the same or different.

That is, the first random count value and the second random count value are the same random count value, or different random count values. However, both the first random count value and the second random count value are generated by the first terminal.

Step 203-2: determine the second resource set: all resources or the second resource of the time slot m+q*Prxlg.

q=1, 2, 3 . . . Q. Prxlg is the quantity of the resource reserved period Prx converted into logical time slots.

In a possible embodiment, the time slot m is a time slot that the first terminal does not monitor in the resource listening window; at this time, the second resource set includes all resources of the time slot m+q*Prxlg.

In a possible embodiment, the time slot m is the time slot to which the first resource belongs, and the first resource is the resource scheduled by the PSCCH that the apparatus monitors in the resource listening window and whose RSRP measurement value is greater than the threshold. The second resource set includes the second resource in the time slot m+q*Prxlg, and the second resource and the first resource have the same frequency domain position.

In summary, in the method provided in the embodiment, when the resource reserved period Prx is less than the parameter a, a random count value is generated; according to the random count value, the quantity of reserved periods Q of the second terminal is determined, so that when the value of Prx is small, the value of the quantity of reserved periods Q is limited to be not too large, there are not too many resources in the second resource set, the conflict between the first resource set and the second resource set is prevented, and the problem of more resources in the candidate resource set may be excluded.

Figure 12:
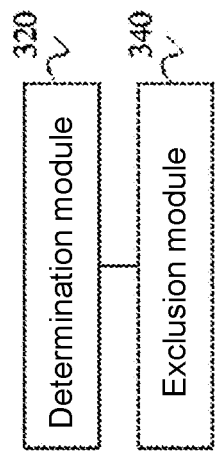
FIG. 12 is a structural block diagram of a resource exclusion apparatus provided by an exemplary embodiment of the application.

FIG. 12 is a block diagram of a resource exclusion apparatus provided by an exemplary embodiment of the application. The apparatus is applied in the first terminal, or the apparatus is implemented as the first terminal or part of the first terminal. The apparatus includes the following.

A determination module 320 is configured to determine the quantity of reserved periods Q of the second terminal according to the resource reserved period Prx and a threshold Tscal, where the threshold Tscal is determined according to a predetermined value.

An exclusion module 340 is configured to exclude a target resource in the first resource set from the candidate resource set in the resource selection window when the first resource set and the second resource set overlap, and the second resource set is determined according to the resource reserved period Prx and the quantity of reserved periods Q.

The first resource set includes at least one resource that may be used by the apparatus, and the second resource set includes at least one resource that may be used by the second terminal.

In an optional embodiment, the determination module 320 is configured to perform the following.

When the difference between time n and time m is less than or equal to the quantity of logical time slots Prxlg, and the resource reserved period Prx is less than the threshold Tscal, it is determined that the quantity of reserved periods Q is equal to the rounded up quotient of the threshold Tscal and the resource reservation period Prx.

When the difference between time n and time m is greater than the quantity of logical time slots Prxlg, or when the resource reserved period Prx is equal to or greater than the threshold Tscal, it is determined that the quantity of reserved periods Q is equal to 1.

The time n is the arrival time of the data packet of the service. The time m is the time corresponding to the time slot m. The Prxlg is the quantity of logical time slots corresponding to the resource reserved period Prx, the time slot m is a time slot that the first terminal does not monitor in the resource listening window, or the time slot m is the time slot to which the first resource belongs. The first resource is a resource scheduled by the physical sidelink control channel PSCCH monitored by the first terminal in the resource listening window, and the reference signal received power (RSRP) measurement value is greater than a threshold.

In an optional embodiment, the predetermined value includes the following.

T2 is the difference between the end time of the resource selection window and the time n, and the time n is the arrival time of the data packet of service.

Alternatively, $T2_{min}$ is the lower limit of the value of the T2.

Alternatively, the predetermined value includes the service delay requirement range.

Alternatively, the predetermined value includes the difference between T2 and T1, where T1 is the difference between the start time of the resource selection window and the time n.

Alternatively, the predetermined value includes 100 ms.

In an optional embodiment, the resource reserved period Prx and the threshold Tscal are positively related.

In an optional embodiment, the threshold Tscal is equal to the product of the modification factor β and the predetermined value, and the modification factor β is positively related to the resource reserved period Prx.

In an optional embodiment, the apparatus further includes the following.

A modification module is configured to make the resource reserved period Prx equal to the parameter a when the resource reserved period Prx is less than the parameter a.

In an optional embodiment, the determination module 320 is further configured to generate a random count value when the resource reserved period Prx is less than the parameter a; the quantity of reserved periods Q of the second terminal is determined according to the random count value.

In an optional embodiment, the parameter a is an integer multiple of the Prx.

In an optional embodiment, the second resource set includes all resources in the time slot m+q*Prxlg;

The time slot m is the time slot that the apparatus does not monitor in the resource listening window; the q=1, . . . , Q; the Prxlg is the quantity of the logical time slots corresponding to the resource reserved period Prx.

In an optional embodiment, the second resource set includes the second resource in the time slot m+q*Prxlg.

The time slot m is the time slot to which the first resource belongs, and the first resource is the resource scheduled by the PSCCH that the apparatus monitors in the resource listening window and whose RSRP measurement value is greater than the threshold; the q=1, . . . , Q; the Prxlg is the quantity of logical time slots corresponding to the resource reserved period Prx; the frequency domain positions of the second resource and the first resource are the same.

Figure 13:
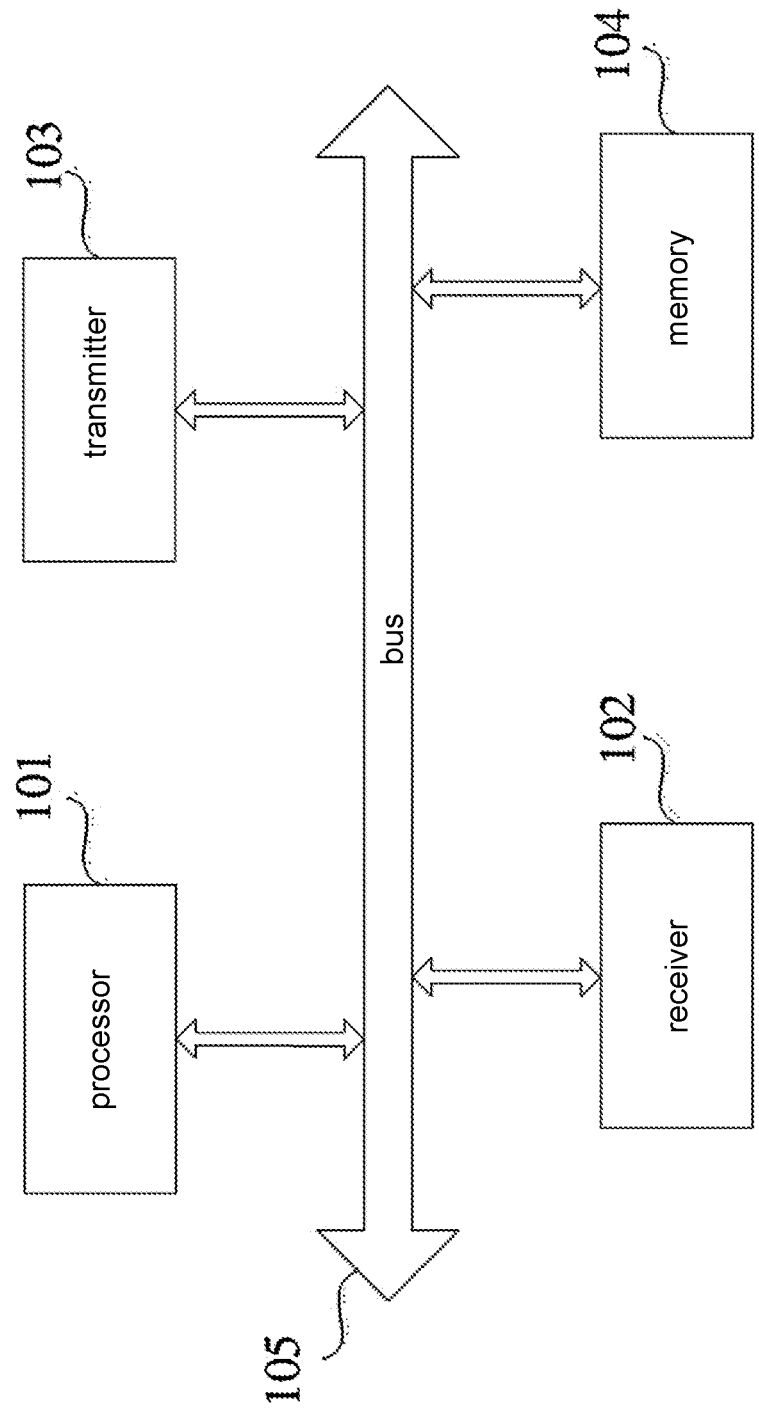
FIG. 13 is a schematic structural diagram of a communication device provided by an exemplary embodiment of the application.

FIG. 13 is a schematic structural diagram of a communication device (a network device or a terminal device) provided by an exemplary embodiment of the application. The communication device includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, which may be a communication chip and/or a transceiver connected to the processor 101.

The memory 104 is connected to the processor 101 through the bus 105.

The memory 104 may be configured to store at least one instruction, and the processor 101 may be configured to execute the at least one instruction, so as to implement various steps in the foregoing method embodiments.

Furthermore, the memory 104 may be implemented by any type of volatile or non-volatile storage devices or a combination thereof. Volatile or non-volatile storage devices include, but are not limited to, a magnetic disk or an optical disk, an erasable programmable read only memory (EE-PROM), a static random access memory (SRAM), a read-only memory (ROM), a magnetic memory, a flash memory, a programmable read-only memory (PROM).

In an exemplary embodiment, a computer-readable storage medium is also provided, and the computer-readable storage medium stores at least one instruction, at least one segment of program, a code set, or an instruction set. The at least one instruction, the at least one segment of program, the code set, or the instruction set are loaded and executed by the processor to implement the resource exclusion method executed by the terminal device provided by each of the method embodiments, or the resource exclusion method performed by the network device.

A person of ordinary skill in the art can understand that all or part of the steps in the above embodiments can be implemented by hardware, or by a program to instruct relevant hardware to complete, the program may be stored in a computer-readable storage medium, and the above-mentioned storage medium may be a read-only memory, a magnetic disk, or an optical disk.

The foregoing descriptions are only preferred embodiments of the application and are not intended to limit the application. Any modification, equivalent replacement, improvement, and the like made within the spirit and principle of the application shall be included in the protection scope of the application.

What is claimed is:

1. A resource exclusion method, applied in a first terminal, wherein the method comprises:
    determining a quantity of reserved periods Q of a second terminal according to a resource reserved period Prx and a threshold Tscal, where the threshold Tscal is determined according to a predetermined value;
    when a first resource set and a second resource set overlap, excluding a target resource in the first resource set from a candidate resource set in a resource selection window, wherein the second resource set is determined according to the resource reserved period Prx and the quantity of reserved periods Q;
    wherein the first resource set includes at least one resource possibly used by the first terminal, and the second resource set includes at least one resource possibly used by the second terminal, wherein the predetermined value comprises T2, wherein T2 is a difference between an end time of the resource selection window and time n, wherein time n is a timing point when a resource selection needs to be performed for an arrived data packet of a service.

2. The resource exclusion method according to claim 1, wherein the step of determining the quantity of reserved periods Q of the second terminal according to the resource reserved period Prx and the threshold Tscal comprises:
    when a difference between time n and time m is less than or equal to a quantity of logical time slots Prxlg, and the resource reserved period Prx is less than the threshold Tscal, determining that the quantity of reserved periods Q is equal to the threshold Tscal and a rounded up quotient of the resource reserved period Prx;
    when the difference between the time n and the time m is greater than the quantity of logical time slots Prxlg, or when the resource reserved period Prx is equal to or greater than the threshold Tscal, determining that the quantity of reserved periods Q is equal to 1;
    wherein the time n is an arrival time of a data packet of a service, the time m is time corresponding to time slot m, the quantity of logical time slots Prxlg is the quantity of logical time slots corresponding to the resource reserved period Prx, the time slot m is a time slot that the first terminal does not monitor in the resource listening window, or the time slot m is a time slot to which the first resource belongs, and the first resource is a resource scheduled by a physical sidelink control channel (PSCCH) monitored by the first terminal in the resource listening window and whose reference signal received power (RSRP) measurement value is greater than a threshold.

3. The resource exclusion method according to claim 1, wherein the resource reserved period Prx and the threshold Tscal are positively related.

4. The resource exclusion method according to claim 3, wherein the threshold Tscal is equal to a product of a modification factor β and the predetermined value, and the modification factor β is positively related to the resource reserved period Prx.

5. The resource exclusion method according to claim 1, wherein the method further comprises:
    when the resource reserved period Prx is less than a parameter a, making the resource reserved period Prx be equal to the parameter a.

6. The resource exclusion method according to claim 1, wherein the method further comprises:
    when the resource reserved period Prx is less than a parameter a, generating a random count value;
    determining the quantity of reserved periods Q of the second terminal according to the random count value.

7. The resource exclusion method according to claim 5, wherein the parameter a is an integer multiple of the resource reserved period Prx.

8. The resource exclusion method according to claim 1, wherein the second resource set comprises all resources in time slot m+q*Prxlg;
    wherein the time slot m is the time slot that the first terminal does not monitor in the resource listening window; the q=1, ..., Q; the quantity of logical time slots Prxlg is the quantity of logical time slots corresponding to the resource reserved period Prx.

9. The resource exclusion method according to claim 1, wherein the second resource set comprises the second resource in the time slot m+q*Prxlg;
    wherein the time slot m is the time slot to which the first resource belongs, and the first resource is the resource scheduled by the physical sidelink control channel (PSCCH) that the first terminal monitors in the resource listening window and whose reference signal received power (RSRP) measurement value is greater than the threshold; the q=1, ..., Q; the quantity of logical time slots Prxlg is the quantity of logical time slots corresponding to the resource reserved period Prx; and frequency domain positions of the second resource and the first resource are the same.

10. A first terminal, comprising:
    a processor;
    a transceiver connected to the processor;
    a memory for storing executable instructions for the processor;
    wherein the processor is configured to load and execute the executable instructions to implement:
    determining a quantity of reserved periods Q of a second terminal according to a resource reserved period Prx and a threshold Tscal, where the threshold Tscal is determined according to a predetermined value;
    excluding a target resource in a first resource set from a candidate resource set in a resource selection window when the first resource set and a second resource set overlap, and the second resource set is determined according to the resource reserved period Prx and the quantity of reserved periods Q;
    wherein the first resource set includes at least one resource possibly used by the first terminal, and the second resource set includes at least one resource possibly used by the second terminal, wherein the predetermined value comprises T2, wherein T2 is a difference between an end time of the resource selection window and time n, wherein time n is a timing point when a resource selection needs to be performed for an arrived data packet of a service.

11. The first terminal according to claim 10, wherein the processor is configured to:
    when a difference between time n and time m is less than or equal to a quantity of logical time slots Prxlg, and the resource reserved period Prx is less than the threshold Tscal, determine that the quantity of reserved periods Q is equal to the threshold Tscal and a rounded up quotient of the resource reserved period Prx;
    when the difference between the time n and the time m is greater than the quantity of logical time slots Prxlg, or when the resource reserved period Prx is equal to or greater than the threshold Tscal, determine that the quantity of reserved periods Q is equal to 1;

wherein the time n is an arrival time of a data packet of a service, the time m is time corresponding to time slot m, the quantity of logical time slots Prxlg is the quantity of logical time slots corresponding to the resource reserved period Prx, the time slot m is a time slot that the first terminal does not monitor in the resource listening window, or the time slot m is a time slot to which the first resource belongs, and the first resource is a resource scheduled by a physical sidelink control channel (PSCCH) monitored by the first terminal in the resource listening window and whose reference signal received power (RSRP) measurement value is greater than a threshold.

12. The first terminal according to claim 10, wherein the resource reserved period Prx and the threshold Tscal are positively related.

13. The first terminal according to claim 12, wherein the threshold Tscal is equal to a product of a modification factor β and the predetermined value, and the modification factor β is positively related to the resource reserved period Prx.

14. The first terminal according to claim 10, wherein the processor is further configured to perform:
making the resource reserved period Prx be equal to a parameter a when the resource reserved period Prx is less than the parameter a.

15. The first terminal according to claim 10, wherein the processor is further configured to generate a random count value when the resource reserved period Prx is less than a parameter a and determine the quantity of reserved periods Q of the second terminal according to the random count value.

16. The first terminal according to claim 10, wherein the second resource set comprises all resources in time slot m+q*Prxlg;
wherein the time slot m is the time slot that the apparatus does not monitor in the resource listening window; the q=1, . . . , Q; the quantity of logical time slots Prxlg is the quantity of logical time slots corresponding to the resource reserved period Prx.

17. The first terminal according to claim 10, wherein the second resource set comprises the second resource in the time slot m+q*Prxlg;
wherein the time slot m is the time slot to which the first resource belongs, and the first resource is the resource scheduled by the physical sidelink control channel (PSCCH) that the apparatus monitors in the resource listening window and whose reference signal received power (RSRP) measurement value is greater than the threshold; the q=1, . . . , Q; the quantity of logical time slots Prxlg is the quantity of logical time slots corresponding to the resource reserved period Prx; and frequency domain positions of the second resource and the first resource are the same.

18. A non-transitory computer-readable storage medium, wherein executable instructions are stored in the readable storage medium, and the executable instructions are loaded and executed by a processor to implement steps of:
determining a quantity of reserved periods Q of a second terminal according to a resource reserved period Prx and a threshold Tscal, where the threshold Tscal is determined according to a predetermined value;
when a first resource set and a second resource set overlap, excluding a target resource in the first resource set from a candidate resource set in a resource selection window, wherein the second resource set is determined according to the resource reserved period Prx and the quantity of reserved periods Q;
wherein the first resource set includes at least one resource possibly used by the first terminal, and the second resource set includes at least one resource possibly used by the second terminal, wherein the predetermined value comprises T2, wherein T2 is a difference between an end time of the resource selection window and time n, wherein time n is a timing point when a resource selection needs to be performed for an arrived data packet of a service.

* * * * *